United States Patent [19]
Jeong

[11] Patent Number: 6,163,119
[45] Date of Patent: Dec. 19, 2000

[54] SENSORLESS SPEED CONTROL METHOD OF HIGH SPEED MOTOR

[75] Inventor: Moon-Jong Jeong, Suwon, Rep. of Korea

[73] Assignee: SamSung Electronics Co., Ltd., Suwon, Rep. of Korea

[21] Appl. No.: 09/344,127

[22] Filed: Jun. 24, 1999

[30] Foreign Application Priority Data

Jan. 15, 1999 [KR] Rep. of Korea ............ 99-1089

[51] Int. Cl.⁷ ........................................... H02P 7/06
[52] U.S. Cl. ..................... 318/254; 318/138; 318/439
[58] Field of Search ........................... 318/798, 799, 318/801, 811, 254, 609, 138, 439, 720–724; 388/934, 811

[56] References Cited

U.S. PATENT DOCUMENTS

| | | | |
|---|---|---|---|
| 4,275,343 | 6/1981 | Fulton et al. | 318/721 |
| 4,746,844 | 5/1988 | MacKelvie et al. | 318/254 |
| 4,939,600 | 7/1990 | Desai et al. | 360/78.04 |
| 5,023,527 | 6/1991 | Erdman et al. | 318/254 |
| 5,036,264 | 7/1991 | Ueki | 318/254 |
| 5,125,067 | 6/1992 | Erdman | 388/934 |
| 5,206,567 | 4/1993 | Sakurai et al. | 312/254 |
| 5,260,811 | 11/1993 | Morikawa | 358/474 |
| 5,327,053 | 7/1994 | Mann et al. | 318/254 |
| 5,751,131 | 5/1998 | Sears et al. | 318/778 |
| 5,838,128 | 11/1998 | Maiocchi et al. | 318/439 |
| 5,953,491 | 9/1999 | Sears et al. | 388/811 |
| 5,982,122 | 11/1999 | Hollenbeck et al. | 318/439 |

*Primary Examiner*—Robert E. Nappi
*Assistant Examiner*—Rita Leykin
*Attorney, Agent, or Firm*—Robert E. Bushnell, Esq.

[57] ABSTRACT

A sensorless speed control method of a high speed motor utilizing a reverse electromotive force comprises the steps of: adjusting to 50% a positive duty of rectangular waves generated from a reverse electromotive force signal of the high speed motor after accelerating the high speed motor in an accelerated speed mode to a mode switch RPM (first duty adjusting step); measuring a pulse difference between a rectangular wave edge and a synchronous signal when a voltage is adjusted to allow an ideal current waveform to be formed, thereby setting up a sensorless mode switch condition; utilizing the pulse difference measured in the switch condition set-up step to switch the high speed motor from an accelerated mode to a sensorless mode; and switching the high speed motor at the mode switch step to sensorless mode and increasing the RPM of the high speed motor to a high speed to thereby adjust a positive duty of the rectangular wave. There is an advantage of the inventive method in that the high speed motor is accelerated to switched RPM, a positive duty of a rectangular wave is adjusted at 50% and the high speed motor is switched from switched RPM to sensorless mode to raise the RPM to a high speed and to adjust the positive duty of the rectangular wave to 50%, thereby enabling stable motor control at high speed and a sensorless mode switch.

4 Claims, 7 Drawing Sheets

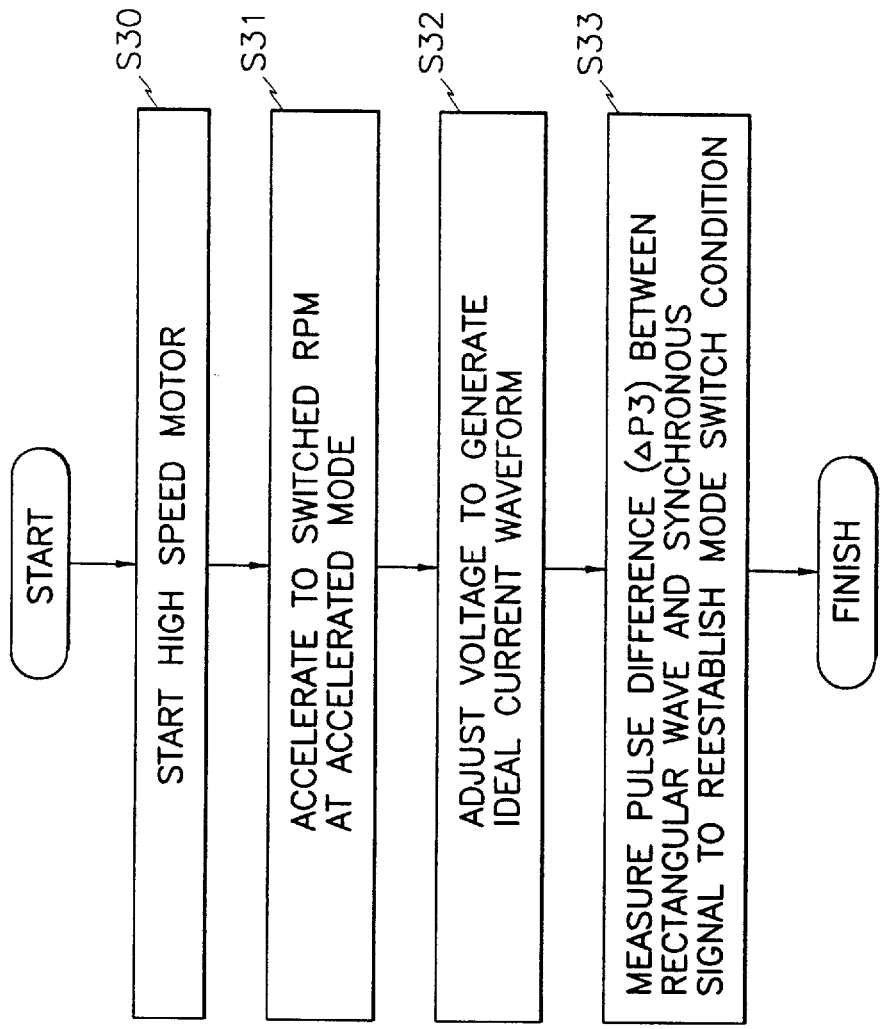

SENSORLESS SPEED CONTROL METHOD OF HIGH SPEED MOTOR

CLAIM OF PRIORITY

This application makes reference to, incorporates the same herein, and claims all benefits accruing under 35U.S.C.§119 from an application for SENSORLESS SPEED CONTROL METHOD OF HIGH SPEED MOTOR earlier filed in the Korean Industrial Property Office on January 15, 1999 and there duly assigned Ser. No. 1089/1999.

BACKGROUND OF INVENTION

Field of the Invention

The present invention relates to sensorless control of a high speed (over 40,000 rpm) brushless direct current motor (hereinafter referred to as high speed motor), and more particularly to a sensorless speed control method of a high speed motor adapted to uniformly adjust the duty of a rectangular signal generated from a reverse electromotive force regardless of rotating speed to thereby provide stable motor control at high speed and to enable a sensorless mode switch.

Description of the Related Art

Generally, a speed control apparatus of a high speed motor according to an inverter method includes, as illustrated in FIG. 1, a speed command unit 10 for commanding a speed desired by a variable resistor and the like, a speed measurer 20 using a reverse electromotive force of a high speed motor 100 to measure a current rotating speed of the high speed motor, a Proportional Integrator (PI) controller 30 for receiving a speed error (e) which is obtained by subtracting the current speed measured by the speed measurer 20 from a set-up speed commanded by the speed commander 10 to thereby perform speed control of the high speed motor 100, a synchronization and Pulse Width Modulation (PWM) controller 40 for receiving an output of the PI controller 30 and a rotor position information detected from the reverse electromotive force of the high speed motor 100 to thereby control the duty and phase of a PWM waveform applied to the high speed motor 100, an inverter driver 50 producing a driving signal output for driving the high speed motor 100 according to an output of the synchronization and PWM controller 40, an inverter 60 for alternatively turning on and turning off a plurality of power transistors according to the driving signal output from the inverter driver 50 so as to convert a Direct Current (DC) power output from a converter (described later) to a 3-phase Alternating Current (AC) power, a reverse electromotive force detector 70 for detecting a reverse electromotive force of the high speed motor 100 so as to shape a signal such that a rotating speed and a position of a rotor can be detected, and a converter 80 for converting an AC power input from an AC power source 81 to a DC power input.

The reverse electromotive force detector 70 is provided, as illustrated in FIG. 2, with a voltage divider 71 for detecting reverse electromotive force signals (a, b, c) of the high speed motor 100 to reduce same to predetermined sizes, an integrator 73 for generating a triangular wave having a phase delay of 90 degrees from the reverse electromotive signals reduced by the voltage divider 71, a comparator 75 for comparing an output of the integrator 73 with a neutral voltage of the reverse electromotive force to generate a rectangular wave, and an isolation unit 77 for converting the rectangular wave of the comparator 75 to a DC ground level, where the integrator 73, as illustrated in FIG. 3, has a variable resistor (VR) connected in a circuit to adjust a duty of the rectangular wave.

When the high speed motor 100 is rotated at a predetermined speed in a speed control apparatus of a high speed motor according to a 3-phase 2-excitement method thus constructed, the reverse electromotive detector 70 connected to an output terminal of the inverter 60 generates following rectangular waves for detecting a rotor position from the reverse electromotive force signals of the high speed motor 100.

First, because sizes of the reverse electromotive force signals (a, b, c) are too big for the integrator 73 to process, the reverse electromotive force signals (a, b, c) of the high speed motor 100 are reduced to appropriate sizes ($V_a$, $V_b$, $V_c$) by the voltage divider 71, as illustrated in FIG. 4.

When the reverse electromotive force signals ($V_a$, $V_b$, $V_c$) reduced by the voltage divider 71 pass the integrator 73, the signals are delayed by 90 degrees to become signals ($V_{ai}$, $V_{bi}$, $V_{ci}$) having triangular wave shapes, as illustrated in FIG. 4.

The output signals ($V_{ai}$, $V_{bi}$, $V_{ci}$) of the integrator 73 are compared with a neutral point voltage ($V_n$) of the reverse electromotive force by the comparator 75 to thereby generate rectangular waves ($S_a$, $S_b$, $S_c$) as illustrated in FIG. 4, and the synchronization and PWM controller 40 detects ascending edges and descending edges of the rectangular waves ($S_a$, $S_b$, $S_c$) to control phases appropriate to the reverse electromotive force waveforms at the time.

The phase changes of the high speed motor 100 are realized at the ascending and descending edges of the rectangular wave signals ($S_a$, $S_b$, $S_c$) generated from the reverse electromotive force signals, such that it is difficult to perform accurate motor control when the rectangular wave signals ($S_a$, $S_b$, $S_c$) are inaccurate.

Although ideal rectangular waves ($S_a$, $S_b$, $S_c$) have 50% of duty, there exists some error due to accuracy of parts, delay of hardwares and the like, and these errors exercise more influence in high speed of rotation than in low speed of rotation, and exercise more influence where there are a large number of poles at the high speed motor 100.

In order to solve the aforementioned problems, in the prior art, the integrator 73 is provided with a variable resistor (VR), as illustrated in FIG. 3, to adjust the duty of the rectangular wave signals ($S_a$, $S_b$, $S_c$) so as to become 50%.

However, there is still a problem in the rectangular wave duty adjusting method of a high speed motor according to the prior art thus described in that positive duties of the rectangular wave signals ($S_a$, $S_b$, $S_c$) are reduced while revolution per minutes RPM are increased.

Furthermore, when the positive duties of the rectangular wave signals ($S_a$, $S_b$, $S_c$) are established at 50% during a lower speed of rotation, the duties become lower than 50% (by way of example, 48%) at high speed of rotation to thereby make motor control unstable. When the positive duties of the rectangular wave signals ($S_a$, $S_b$, $S_c$) are established at 50% during a high speed of rotation, the duties become larger than 50% at low speed of rotation, where a switching condition which should be discriminated from accelerated speed mode to sensorless mode according to a width between an edge signal of the rectangular waves and a synchronous signal after the high speed motor 100 is started, but it is difficult to change the mode due to input of inaccurate rectangular waves.

SUMMARY OF THE INVENTION

The present invention is disclosed to solve the aforementioned problems, and it is one object of the present invention to provide a sensorless speed control method of a high speed motor adapted to accelerate a high speed motor at an accelerated mode to a switched RPM and to adjust a positive duty of a rectangular wave at 50% to thereby enable a sensorless mode switch.

It is another object of the present invention to provide a sensorless speed control method of a high speed motor adapted to increase the RPM of the high speed motor from a sensorless mode to a high speed and to adjust a positive duty of the rectangular wave at 50% when the high speed motor reaches a switched RPM, thereafter to be switched to a sensorless mode, enabling stable motor control at a high speed.

In accordance with the objects of the present invention, there is provided a sensorless speed control method of a high speed motor utilizing a reverse electromotive force, the method comprising the steps of:

adjusting to 50% a positive duty of rectangular waves generated from a reverse electromotive force signal of the high speed motor after accelerating the high speed motor at an accelerated speed mode to a mode switch RPM (first duty adjusting step);

measuring a pulse difference between a rectangular wave edge and a synchronous signal when a voltage is adjusted to allow an ideal current waveform to be made, thereby setting up a sensorless made switch condition;

utilizing the pulse difference measured at the switch condition set-up step to switch the high speed motor from an accelerated mode to a sensorless made; and switching the high speed motor at the mode switch step to sensorless mode and increasing the RPM of the high speed motor to a high speed to thereafter adjust to 50% a positive duty of the rectangular wave.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7 is a flow chart illustrating a re-set-up method of a sensorless mode switch condition at a high speed motor according to the present invention.

DETAILED DESCRIPTION OF THE INVENTION

A preferred embodiment of the present invention will now be described in detail with reference to the accompanying drawings.

Figure 1:
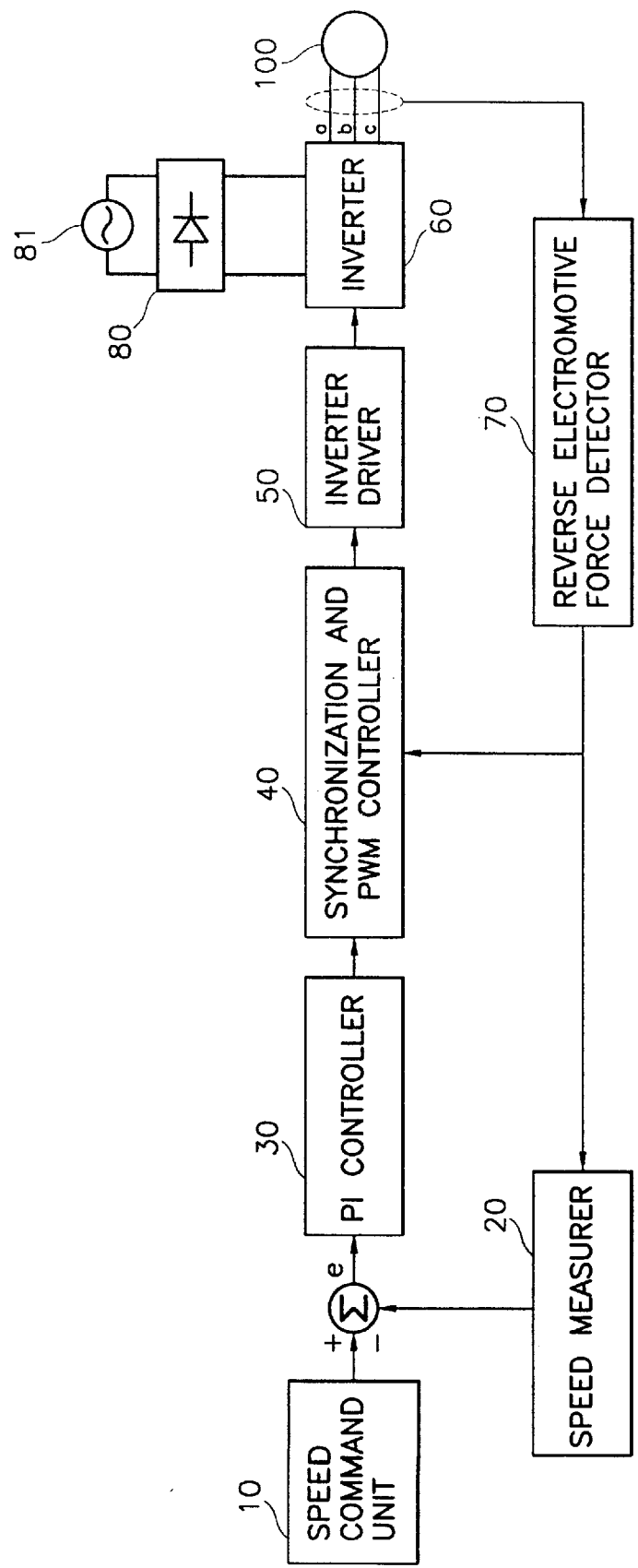
FIG. 1 is a block diagram for illustrating a speed control apparatus of Brushless Direct Current BLDC high speed motor according to the prior art.

A speed control apparatus of a high speed motor according to the present invention includes, as illustrated in FIG. 1, a speed command unit 10 for commanding a speed desired by a variable resistor and the like, a speed measurer 20 using a reverse electromotive force of a high speed motor 100 to measure a current rotating speed of the high speed motor, a Proportional Integrator (PI) controller 30 for receiving a speed error (e) which is obtained by subtracting the current speed measured by the speed measurer 20 from a set-up speed commanded by the speed commander 10 to thereby perform speed control of the high speed motor 100, a synchronization and Pulse Width Modulation (PWM) controller 40 for receiving an output of the PI controller 30 and rotor position information detected from the reverse electromotive force of the high speed motor 100 to control duty and phase of a PWM waveform applied to the high speed motor 100, an inverter driver 50 producing a driving signal output for driving the high speed motor 100 according to an output of the synchronization and PWM controller 40, an inverter 60 for alternatively turning on and turning off a plurality of power transistors according to the driving signal output from the inverter driver 50 so as to convert a Direct Current (DC) power output from a converter (described later) to a 3-phase Alternating Current AC power, a reverse electromotive force detector 70 for detecting a reverse electromotive force of the high speed motor 100 so as to shape a signal such that a rotating speed and a position of a rotor can be detected, and a converter 80 for rectifying and smoothing an AC power input from an AC power source 81 to thereby convert same to a DC power.

Furthermore, the synchronization and PWM controller 40 accelerates the high speed motor to a switched RPM (an RPM appropriate for switching from an accelerated mode to a sensorless mode, 8,000 RPM), to thereafter adjust a positive duty of the rectangular wave to 50%, switches from the switched RPM to the sensorless mode to thereafter raise the RPM to a high speed, and controls a duty of a PWM waveform applied to the high speed motor 100 in order to adjust the positive duty of the rectangular wave to 50%.

Figure 2:
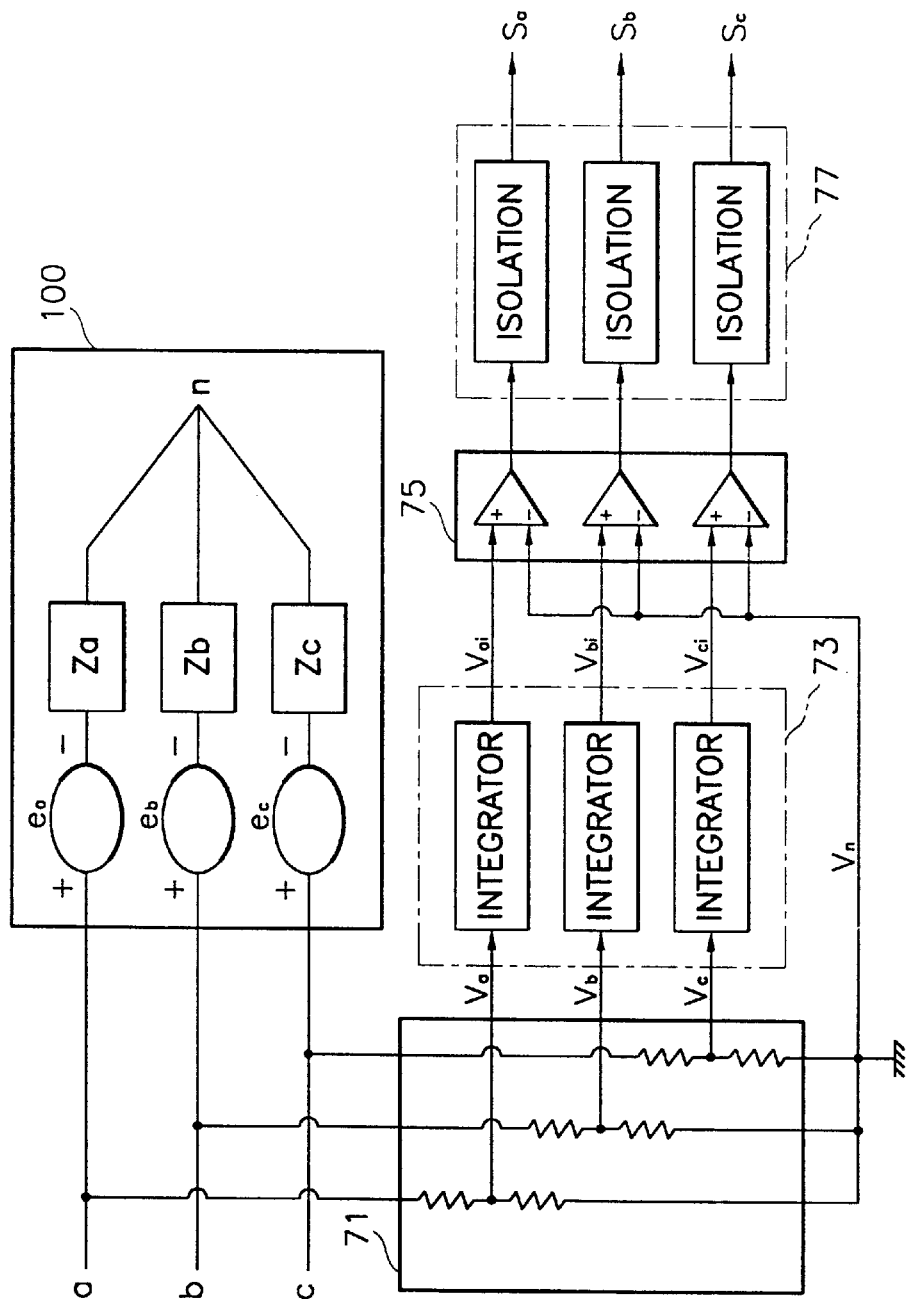
FIG. 2 is a circuit diagram of the reverse electromotive force detector of FIG. 1.
Figure 3:
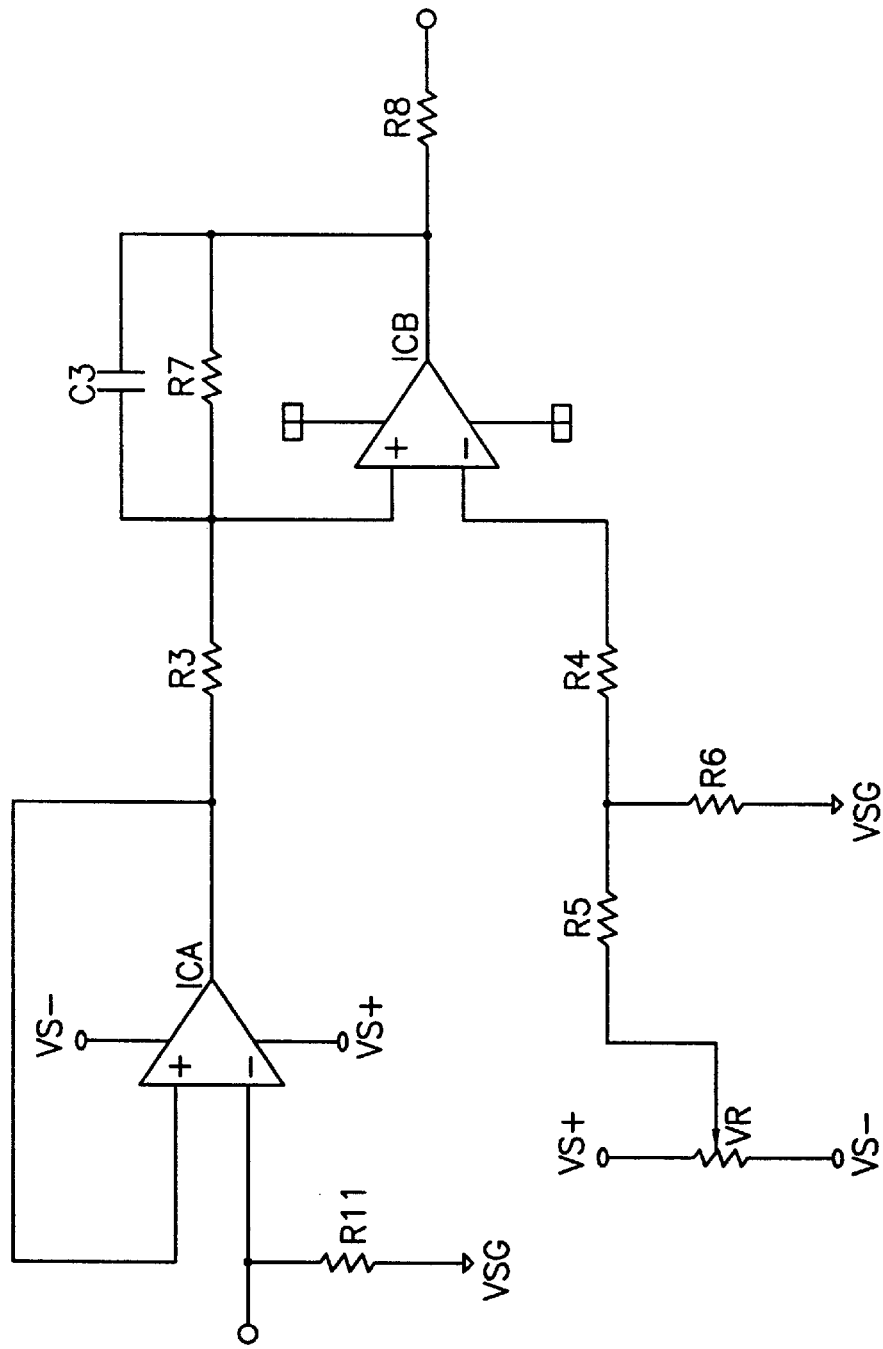
FIG. 3 is a detailed circuit diagram of the integrator of FIG. 2.
Figure 4:
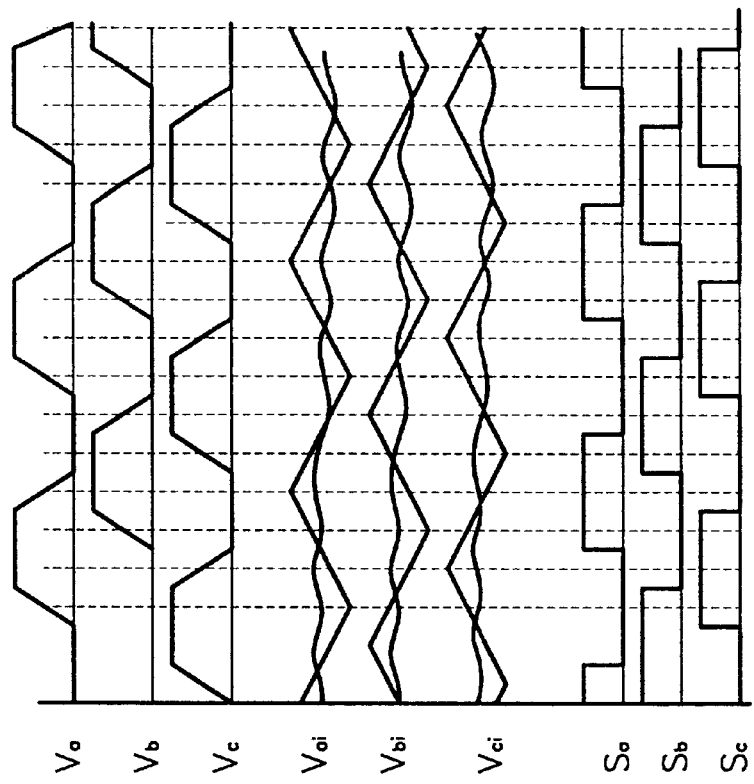
FIG. 4 is a waveform diagram illustrating operation of the reverse electromotive force detector of FIG. 2.

The reverse electromotive force detector 70 has the same structure as illustrated in FIGS. 2 and 3, such that redundant description thereto will be omitted.

Hereinafter, the operational effect of the sensorless speed control method of a high speed motor as thus constructed will be described.

Figure 5:
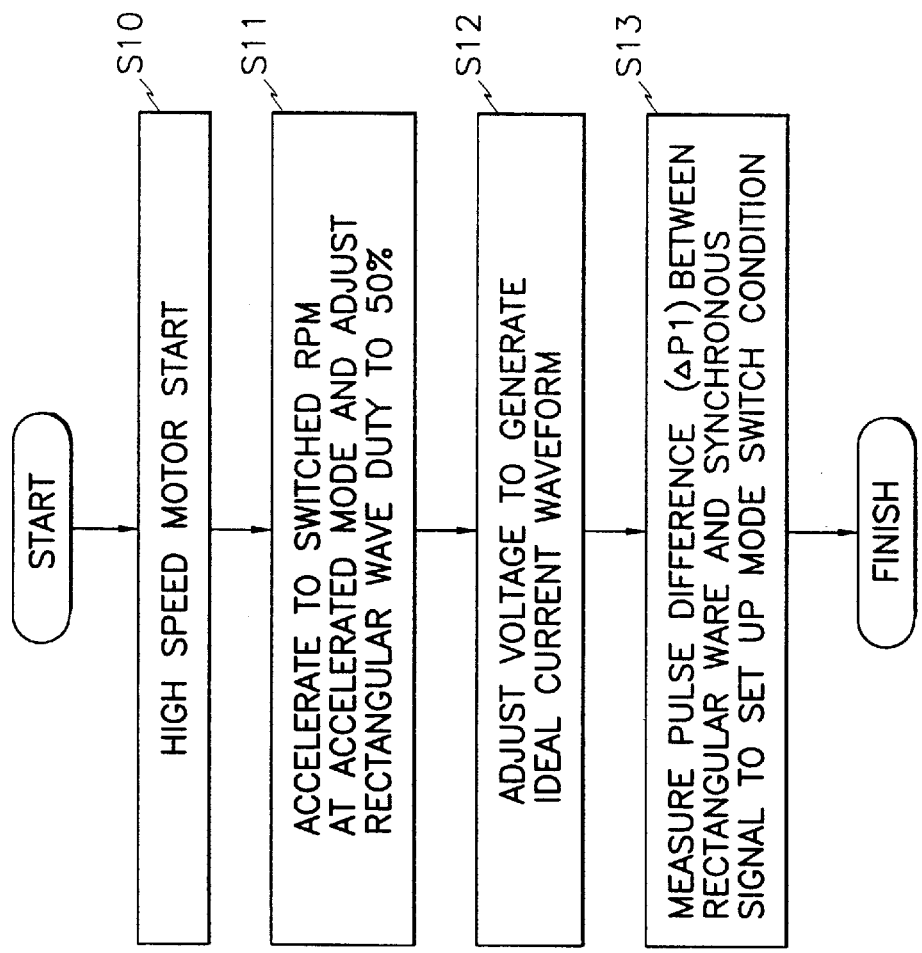
FIG. 5 is a flow chart illustrating a set-up method of a sensorless mode switch condition at a high speed motor according to the present invention.

First, a sensorless mode switch condition of the high speed motor 100 will be set up as illustrated in FIG. 5.

FIG. 5 is a flow chart illustrating a sensorless mode switch condition set-up method of a high speed motor according to the present invention, where S defines the steps.

At step S10, when a speed desired by the high speed motor 100 is ordered by the speed command unit 10, the synchronization and PWM controller 40 serves to output to the inverter driver 50 an inverter driving PWM signal for controlling the duty and phase of PWM waveform applied to the high speed motor 100.

Subsequently, the inverter driver 50 amplifies the PWM signal output from the synchronization and PWM controller 40 to alternatively turn on or turn off six power transistors (not shown) at the inverter 60, and converts the DC power output from the converter 80 to a 3-phase (U-phase, V-phase, W-phase) AC power, thereby starting the high speed motor 100.

When the high speed motor 100 is started, the high speed motor 100 is accelerated in an accelerated mode to a switched RPM (an RPM appropriate for switching from an accelerated mode to a sensorless mode, 8,000 RPM), where the variable resistor (VR) attached to the integrator 73 in the reverse electromotive force detector 70 is utilized to adjust the positive duties of the rectangular wave signals ($S_a$, $S_b$, $S_c$) generated from the reverse electromotive force signal of the high speed motor 100 to 50%, step S11.

At this time, a current waveform generally does not take an ideal shape due to overvoltage, such that, at step S12, voltage is slowly dropped in an accelerated mode by a slide resistor to obtain an ideal current waveform at a certain moment. Subsequently, at step S13, a pulse difference ($\Delta P1$) between a rectangular wave edge signal and a synchronous signal, when an ideal waveform is made, is measured, and a switch condition to a sensorless mode is set up to finish the operation.

At this time, although the pulse difference ($\Delta P1$) under an ideal case should converge to 0, it actually has a certain degree of error.

Figure 6:
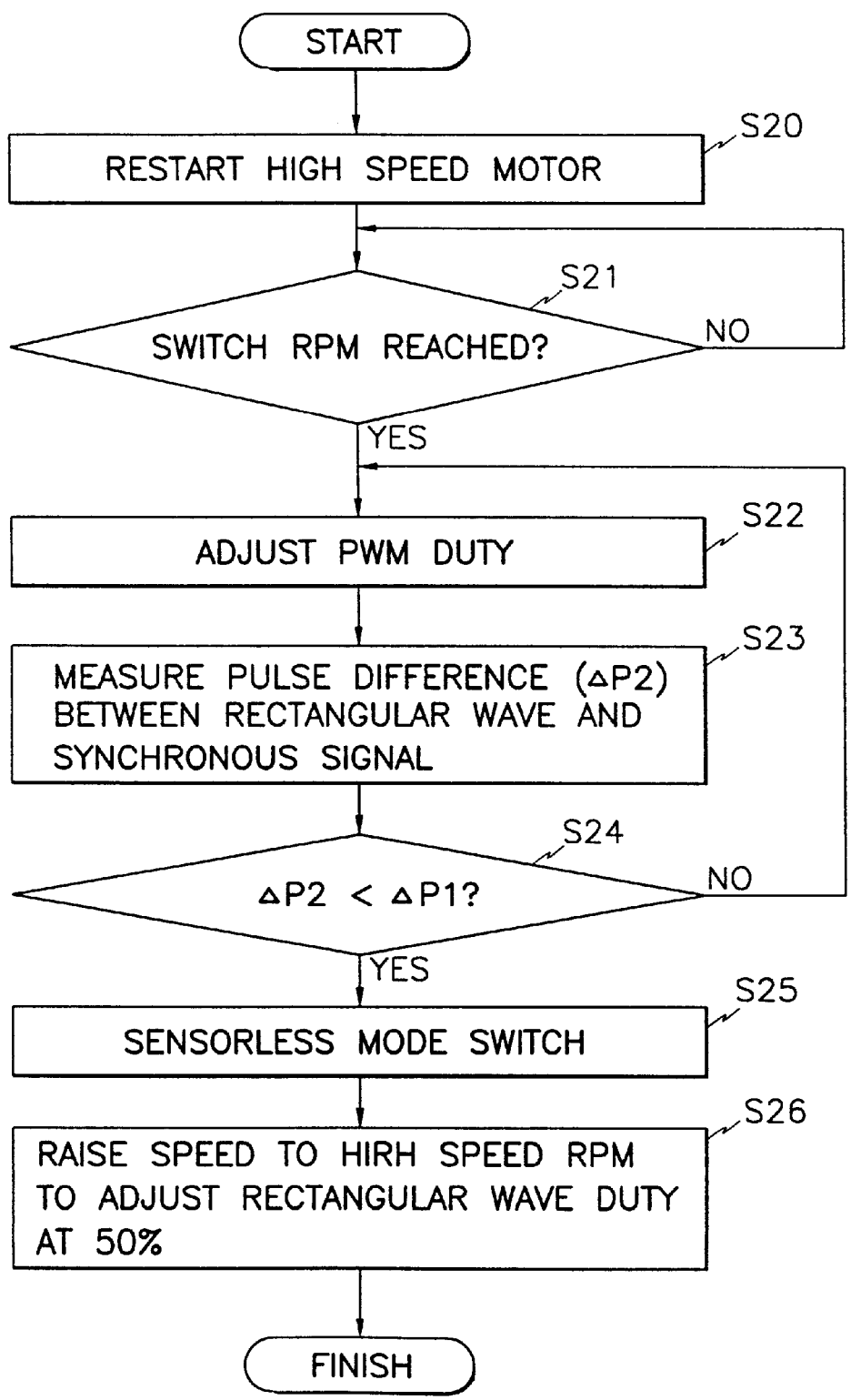
FIG. 6 is a flow chart illustrating a motor control operational procedure during a sensorless mode switch condition and high speed rotation of a high speed motor according to the present invention.

When the switch condition for switching to the sensorless mode is set up by the pulse difference ($\Delta P1$) between the rectangular wave edge signal and the synchronous signal thus described, stable motor control at high speed and sensorless mode switch operation are executed as illustrated in FIG. 6.

FIG. 6 is a flow chart illustrating a sensorless mode switch of a high speed motor and motor control operation procedures at high speed rotation according to the present invention.

At step S20, the synchronization and PWM controller 40 outputs to the inverter driver 50 an inverter driving PWM signal for controlling the duty and phase of a PWM waveform applied to the high speed motor 100. Subsequently, the inverter driver 50 amplifies the PWM signal output from the synchronization and PWM controller 40 to operate the inverter 60, such that DC power output from the converter 80 is converted to a 3-phase (U-phase, V-phase, W-phase) AC power input to restart the high speed motor 100.

After the high speed motor 100 is restarted, at step S21, the high speed motor 100 is accelerated in an accelerated mode, and it is determined whether the high speed motor 100 has reached the switch RPM. When the high speed motor 100 has not reached the switch RPM (in case of NO), operations subsequent to step S21 are not performed until the high speed motor 100 reaches the switch RPM.

If, as a result of step S21, it is determined that the high speed motor 100 reaches the switch RPM (in case of YES), flow advances to step S22, where the synchronization and PWM controller 40 automatically adjusts the PWM duty applied to the high speed motor 100 so as to drop the voltage.

Subsequently, at step S23, the high speed motor is restarted to measure a pulse difference ($\Delta P2$) between a rectangular edge signal and a synchronous signal when the PWM duty is adjusted.

At step S24, a determination is made as to whether the pulse difference ($\Delta P2$) at the time of PWM duty adjustment is smaller than the pulse difference ($\Delta P1$) at the time of ideal current waveform formation, and if the pulse difference ($\Delta P2$) is not smaller than the pulse difference ($\Delta P1$) (in case of NO), flow returns to step S22 to repeatedly perform the operations of step S22 and step S23.

If, as a result of step S24, it is determined that the pulse difference ($\Delta P2$) is smaller than the pulse difference ($\Delta P1$) (in case of YES), flow proceeds to step S25 to switch to the sensorless mode.

After the high speed motor 100 is converted to the sensorless mode, the RPM of the high speed motor 100 is raised to a high speed region (40,000 RPM) at step S26, and the variable resistor (VR) attached to the integrator 73 is utilized to adjust the positive duties of the rectangular wave signals ($S_a$, $S_b$, $S_c$) generated from the reverse electromotive force signal of the high speed motor 100 to 50%, thereby enabling stable motor control at a high speed and a sensorless mode switch condition, and to finish the operation.

At this time, the reason for adjusting the duties of the rectangular wave at high speed is that pulses of ideal rectangular waves are needed at higher speed.

When the positive duties of the rectangular wave at the high speed region is thus adjusted to 50% to thereby realize stable motor control at high speed, a sensorless mode switch condition of the high speed motor 100 for newly setting up a pulse difference for a mode change is re-established as illustrated in FIG. 7.

FIG. 7 is a flow chart illustrating re-establishing method of a sensorless mode switch condition of a high speed motor according to the present invention.

At step S30, the synchronization and PWM controller 40 outputs to the inverter driver 50 an inverter driving PWM signal for controlling the duty and phase of a PWM waveform applied to the high speed motor 100.

Subsequently, the inverter driver 50 amplifies the PWM signal output from the synchronization and PWM controller 40 to activate the inverter 60, such that the DC power output from the converter 80 can be converted to a 3-phase (U-phase, V-phase, W-phase) AC power input to start the high speed motor 100.

After the high speed motor is started, the high speed motor 100 is accelerated in an accelerated mode to switched RPM, step S31, and at step S32, voltage is regulated to obtain an ideal current waveform.

Subsequently, at step S33, a pulse difference ($\Delta P3$) between the rectangular edge and the synchronous signal is measured to reestablish a mode switch condition for switching to a future sensorless mode and to finish the operation.

As is apparent from the foregoing, there is an advantage in the sensorless speed control method of a high speed motor according to the present invention, in that the high speed motor is accelerated to switched RPM, positive duty of rectangular duty is adjusted to 50% and the high speed motor 100 is switched from switched RPM to sensorless mode to raise the RPM to a high speed, and to adjust the positive duty of the rectangular wave to 50%, thereby enabling stable motor control at high speed and a sensorless mode switch.

What is claimed is:

1. A sensorless control method of a high speed motor utilizing a reverse electromotive force, the method comprising the steps of:

accelerating the high speed motor in an accelerated mode to a mode switch RPM;

adjusting a positive duty of a rectangular wave generated from the reverse electromotive force of the high speed motor to 50%; and measuring a pulse difference between a rectangular edge signal and a synchronous signal when an ideal current waveform is formed so as to thereafter establish a sensorless mode switch condition.

2. The method as defined in claim 1, further comprising the step of utilizing the measured pulse difference to switch the high speed motor from the accelerated mode to the sensorless mode, so as to raise RPM to a high speed and to adjust the positive duty of the rectangular wave to 50%.

3. A sensorless control method of a high speed motor utilizing a reverse electromotive force, the method comprising the steps of:

accelerating the high speed motor in an accelerated mode to a mode switch RPM;

adjusting a positive duty of a rectangular wave generated from the reverse electromotive force signal of the high speed motor;

measuring a pulse difference between a rectangular edge signal and a synchronous signal when an ideal current waveform is formed so as to establish a sensorless mode switch condition;

utilizing the measured pulse difference to switch the high speed motor from the accelerated mode to the sensorless mode; and raising the RPM of the high speed motor to a high speed after the high speed motor is switched to the sensorless mode to thereafter adjust a positive duty of a rectangular wave to 50%.

4. The method as defined in claim 3, wherein the utilizing step further comprises the step of restarting the high speed motor to adjust a PWM duty when the high speed motor reaches the mode switch RPM in the accelerated mode, to measure the pulse difference between the rectangular edge signal and the synchronous signal, and to switch the high speed motor from the accelerated mode to the sensorless mode when the pulse difference is smaller than the pulse difference measured at the measuring step.

\* \* \* \* \*